United States Patent [19]
Koch

[11] Patent Number: 5,899,463
[45] Date of Patent: * May 4, 1999

[54] PRESSURE AUGMENTED KISS SEAL

[75] Inventor: William J. Koch, Bellevue, Wash.

[73] Assignee: The Boeing Company, Seattle, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/738,277

[22] Filed: Oct. 25, 1996

[51] Int. Cl.⁶ .................................................. F16J 15/16
[52] U.S. Cl. .................... 277/634; 277/647; 277/921; 49/499.1
[58] Field of Search .................. 277/205, 212 C, 277/634, 644, 647, 921; 49/499.1

[56] References Cited

U.S. PATENT DOCUMENTS

| | | | |
|---|---|---|---|
| 2,199,250 | 4/1940 | Stroebel | 277/634 |
| 2,875,917 | 3/1959 | Alkire | 277/205 |
| 3,159,524 | 12/1964 | Cantabene et al. | 277/634 |
| 3,180,662 | 4/1965 | Parlasca et al. | 277/205 |
| 3,520,543 | 7/1970 | Etter et al. | 277/205 |
| 4,464,128 | 8/1984 | Aso et al. | 277/205 |
| 4,506,768 | 3/1985 | Innocent | 277/634 |
| 5,088,775 | 2/1992 | Corsmeier et al. | . |
| 5,213,346 | 5/1993 | Thomson et al. | 277/634 |
| 5,451,064 | 9/1995 | Mercuri et al. | . |
| 5,516,123 | 5/1996 | Eckel | 277/212 C |
| 5,630,593 | 5/1997 | Swensen et al. | 277/647 |
| 5,676,381 | 10/1997 | Buzzoni et al. | 277/634 |

*Primary Examiner*—Daniel G. DePumpo
*Attorney, Agent, or Firm*—Christensen O'Connor Johnson & Kindness PLLC

[57] ABSTRACT

A kiss seal (42) of C-shaped cross section is provided. The kiss seal (42) includes a first leg (54), a second leg (56), and an arcuate middle portion (46) extending therebetween. The first leg (54) includes a contact surface (24') positioned adjacent a separable flange (28). The second leg (56) is attached to an opposed attachment flange (18) using a face plate (20') and a number of screws (22). The second leg (56) is generally located directly beneath the first leg (54). During sealing use, the arcuate middle portion (46) extends greater-than-180 degrees and is located outboard of one or both flange outboard edges (31). This provides a resultant force vector (58) that acts to enhance sealing. The greater the pressure (P) on the arcuate middle portion (46), the greater the force vector components available to promote sealing.

7 Claims, 4 Drawing Sheets

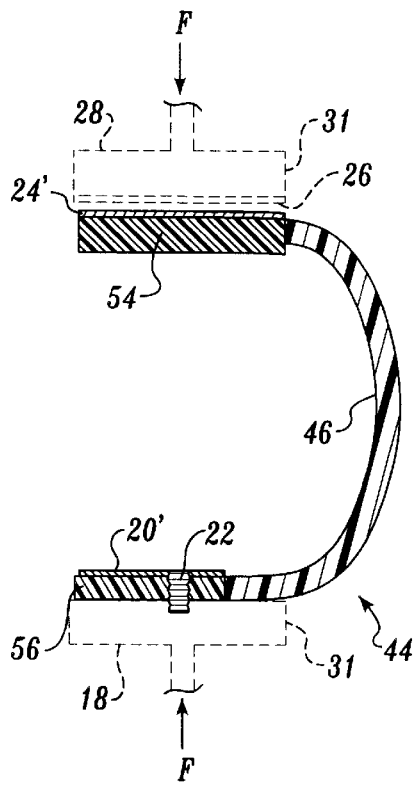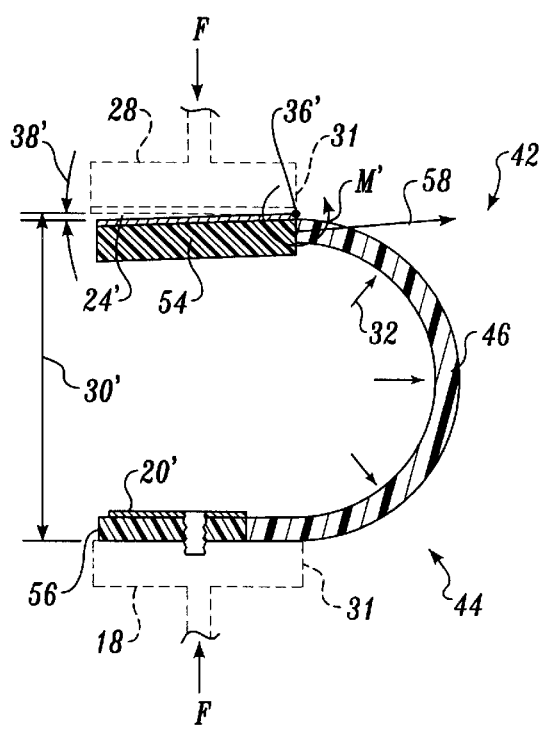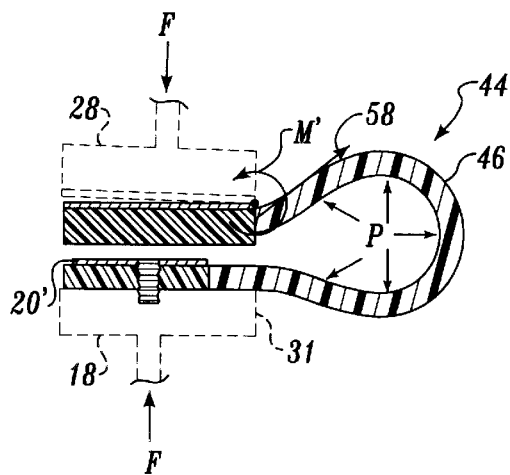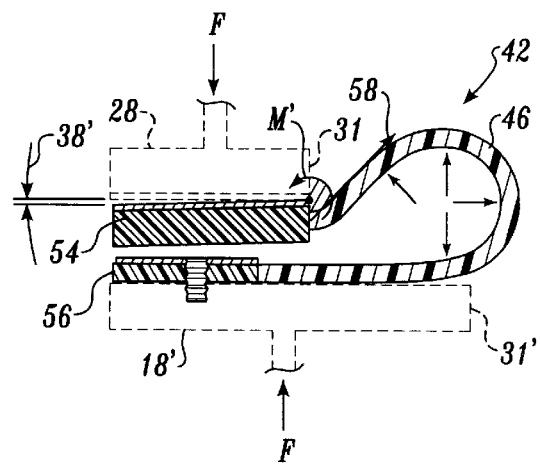
Fig. 5A
Fig. 5B
Fig. 5C
Fig. 6

PRESSURE AUGMENTED KISS SEAL

FIELD OF THE INVENTION

The present invention relates to pressure seals, and in particular, to kiss seals used in maintaining an air-tight junction between opposed flange surfaces in an aircraft.

BACKGROUND OF THE INVENTION

Numerous types of seals have been designed for use on aircraft to seal against gas leakage at junctions formed between connecting ducts, access panels, or the like. These seals are generally termed "kiss" seals because there are located between flanges that are positioned "face-to-face". Conventionally, a kiss seal is secured to one of the flanges and is pressed against the other flange. Pressurized gas inside the duct produces an outward force, against the membrane of the kiss seal. The function of the seal is to prohibit gas leakage at the unsecured flange.

Known kiss seals suffer from a number of design problems, the most significant of which is how to design a kiss seal that will not leak. If leakage is allowed to occur and continue, in many applications the related structure will vibrate and, as a result, cause failure of the seal, the flanges, or both. To form a tight seal between the kiss seal and adjacent flange surfaces, current designs rely primarily on the seal membrane material stiffness to maintain contact with the flanges. Stiff materials require a large amount of force to mate with the flanges, particularly if the seal is large. More flexible materials result in a poor seal.

The overall shape of a kiss seal also effects its capacity to form a tight bond. During use, linear portions in the seal platform shape will experience longitudinal twisting. This motion can result in flow leakage. Small openings with circular planforms are therefore most desirable, while large openings with rectangular planforms are least desirable. In addition, high temperature and high pressure environments, such as within aircraft engines, are further impediments to good seal performance. Engine duct environments often reach temperatures of 300° F. and pressures of 15 psig.

In addition to the above concerns, a designer must also consider the range of flange-to-flange distances, called flange gaps, that must be accommodated during use. Each kiss seal has a range of compression heights, called its sealing range, within which the seal will be effective. The design goal is to provide a kiss seal with a sealing range that matches the range of anticipated flange gaps. If the expected flange gap range is wide, the sealing range of the kiss seal must be correspondingly wide. If the flange gap is too wide, leakage will occur. The opposite extreme is called bottoming out. Bottoming out occurs when a kiss seal is compressed beyond its design limits. When a kiss seal bottoms out, the seal buckles and folds over onto itself. In aircraft applications, inflight flange motion and assembly tolerances can be quite large, making it particularly important for kiss seals on aircraft to perform well over a wide range of flange gaps.

Therefore, a need exists for a superior kiss seal for use in aircraft applications. The ideal kiss seal should have good sealing capability over a wide range of flange gaps and should require very low compression force to create a seal. The ideal kiss seal should also be able to compress to a small height without bottoming out. The present invention is directed to fulfilling this need.

SUMMARY OF THE INVENTION

In accordance with the present invention, a new and improved kiss seal suitable for use in pressurized ducts and the like is provided. The kiss seal is connected to an attachment flange and for sealing against a separable flange. The kiss seal includes a membrane that, during sealing use, has a bulbous protrusion that extends outwardly from one or both of the flanges. Preferably, the bulbous protrusion extends outwardly from at least the separable flange to prevent vibration-induced wear between the seal and the separable flange. The pressure inside of the bulbous protrusion produces a force that counteracts the pressure forces attempting to move the kiss seal away from the unsecured flange.

In accordance with other aspects of this invention, the kiss seal membrane includes a first leg, a second leg, and an arcuate middle leg extending between the first and second legs. The first leg is positioned to contact the unsecured flange as the unsecured flange moves toward the kiss seal. The second leg is attached to one of the flanges to be sealed, i.e., the attachment flange, preferably using a face plate and screws. Prior to engagement, the first and second legs lie parallel to one another. During sealing use, the arcuate middle leg circumscribes an arc of more than 180 degrees for a single radius, thereby creating the bulbous protrusion outboard of one or both flange edges.

In accordance with other aspects of this invention, the arcuate middle leg has a length equal to or greater than (½) π times the distance between the opposed flanges when the kiss seal is positioned at its maximum compression height.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 5A is a cross-sectional side view of a kiss seal formed in accordance with the present invention in an uncompressed state;

FIG. 5B is a cross-sectional side view of the kiss seal of FIG. 5A at a maximum compression height;

FIG. 5C is a cross-sectional side view of the kiss seal of FIG. 5A at a minimum compression height; and FIG. 6 is a cross-sectional side view of a kiss seal formed in accordance with the present invention mounted between flanges that extend outboard by unequal amounts.

DETAILED DESCRIPTION OF THE PREFERRED EMBODIMENTS

Figure 1:
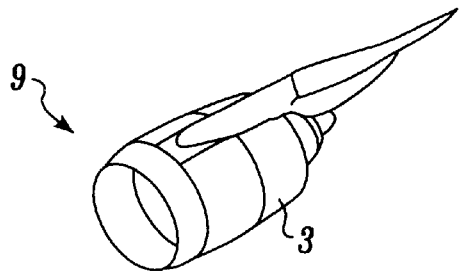
FIG. 1 is a perspective view of a jet aircraft engine in which kiss seals are used.
Figure 2:
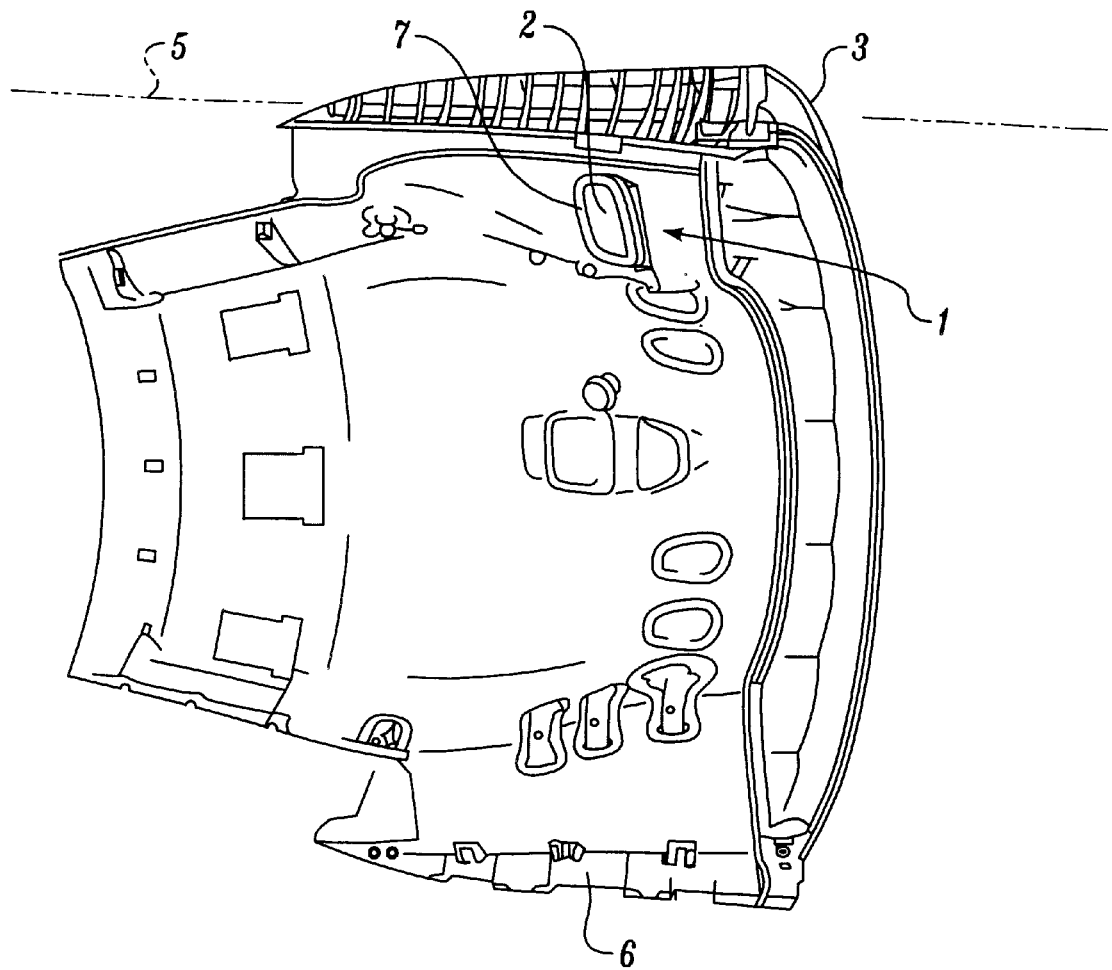
FIG. 2 is a perspective view of the outer cowl of the engine of FIG. 1.
Figure 3:
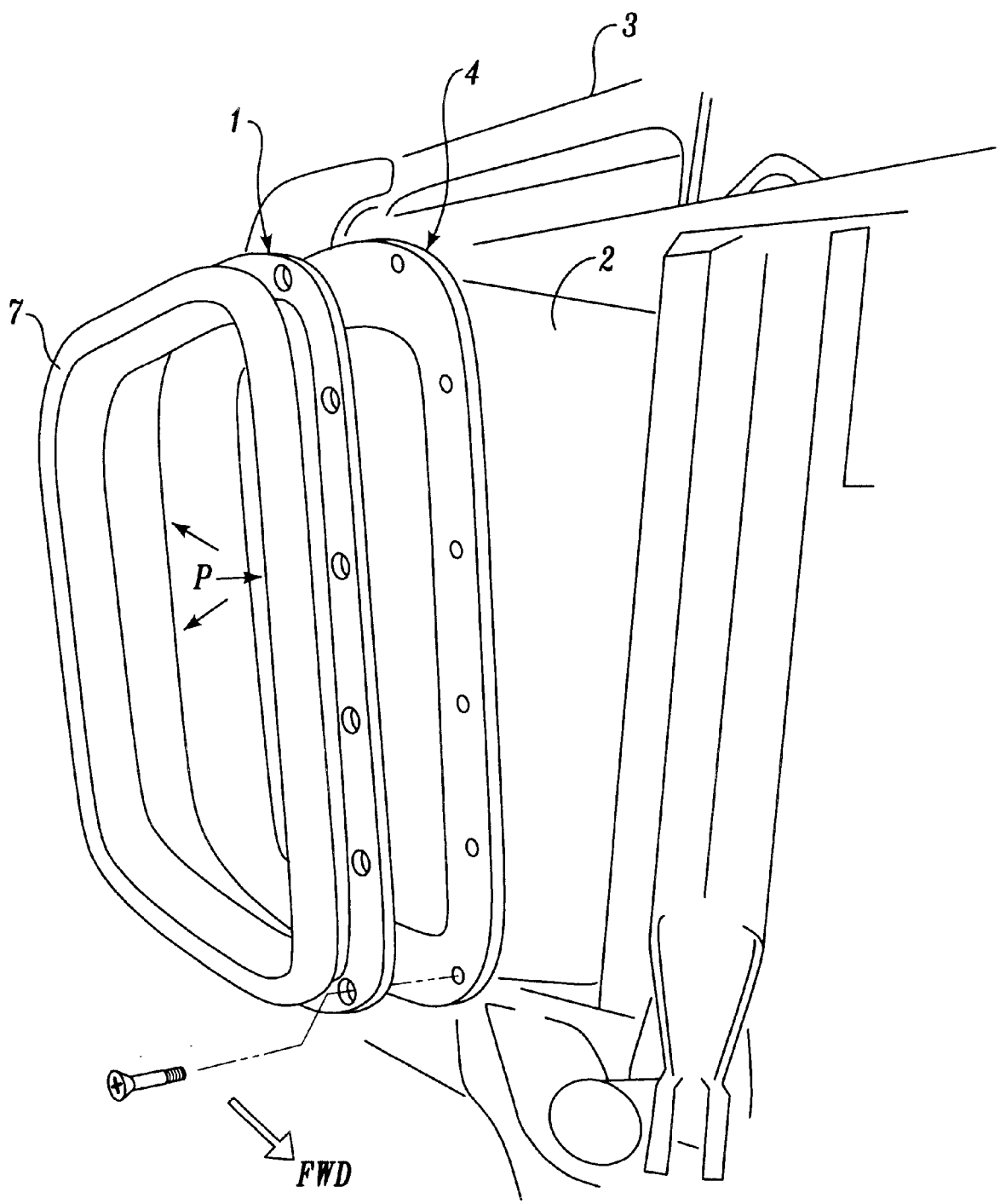
FIG. 3 is a perspective view of a kiss seal suitable for use in the engine cowl shown in FIG. 2.

Prior to describing the present invention and in order to better understand the use and benefits of the invention, a brief description of one use of the invention is provided followed by a brief description of a prior art kiss seal. In this regard, FIG. 1 illustrates a conventional turbofan jet engine 9. Located on opposed sides of the engine 9 are outer cowls 3. The interior of one of the outer cowls 3 is shown in FIG. 2. FIG. 3 is an enlarged perspective view of the kiss seal 1 shown in FIG. 2.

The outer cowls 3 are moved to their closed position shown in FIG. 1 by being rotated inward about an upper longitudinal hinge lines 5. After being closed, each outer cowl is secured along a lower edge 6 to fasteners located at the bottom of the engine. As shown best in FIG. 3, a kiss seal 1 is attached to a flange 4 located in the interior surface of an outer cowl 3. As the outer cowl 3 is closed, the unsecured kiss seal surface 7 presses against a flange (not shown) formed in the engine casing. This causes the kiss seal 1 to compress. Pressure P inside of the duct 2 exerts an outward force on the kiss seal 1. The purpose of the kiss seal is to maintain contact between its unsecured surface 7 and the engine flange to prevent duct gases from leaking out of the duct 2 and into the region between the outer cowl 3 and the engine.

Figure 4A:
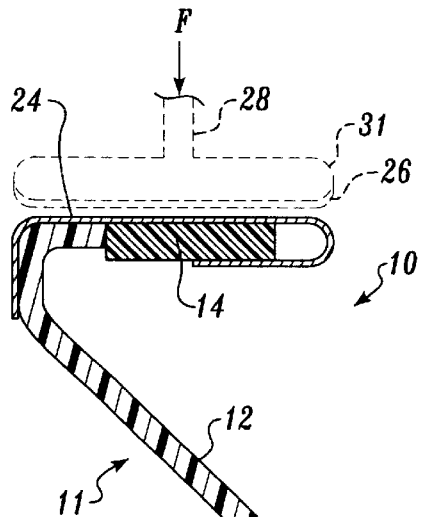
FIG. 4A is a cross-sectional side view of a prior art Z seal in an uncompressed state.
Figure 4B:
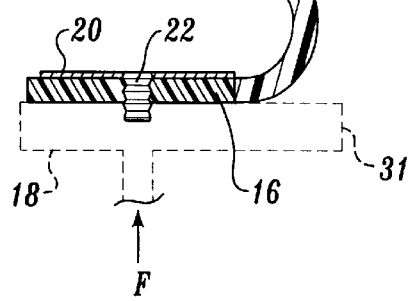
FIG. 4B is a cross-sectional side view of the Z seal of FIG. 4A at a maximum compression height.
Figure 4C:
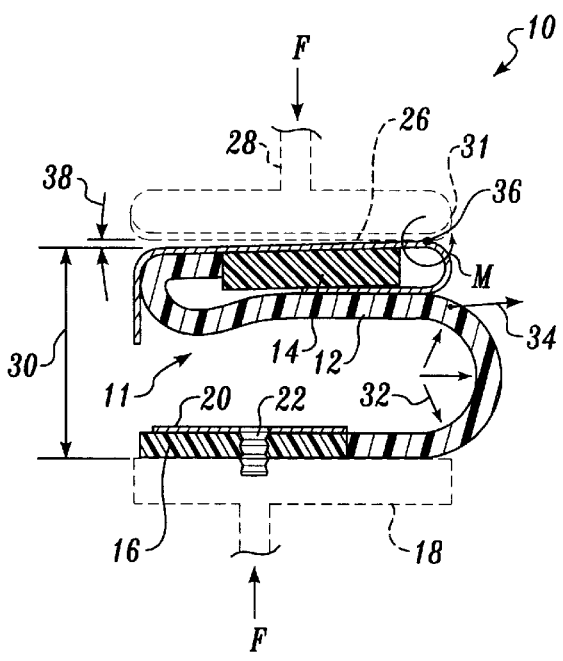
FIG. 4C is a cross-sectional side view of the Z seal of FIG. 4A at a minimum compression height.
Figure 4C:
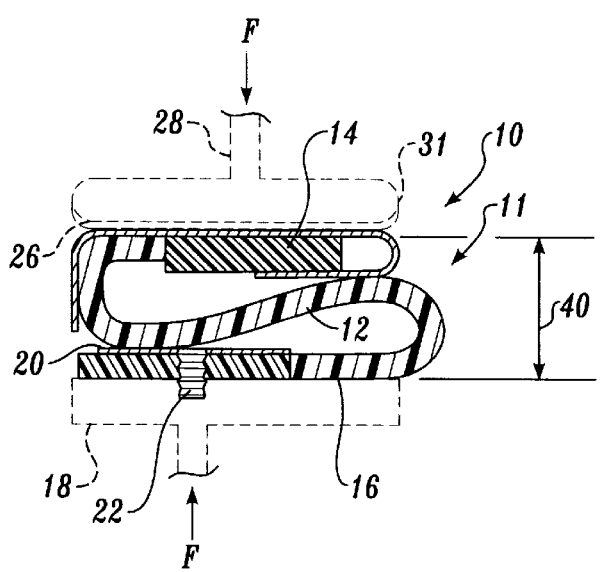

Existing kiss seals designed for use in aircraft engines of the type shown in FIG. 1 are not as satisfactory as currently designed. A typical prior art Z-type kiss seal 10 (or "Z seal", for short) is shown in FIGS. 4A–4C. FIG. 4A shows the Z seal uncompressed, i.e., prior to when the Z seal contacts the engine flange; FIG. 4B shows the Z seal 10 partially compressed; and FIG. 4C shows the Z seal fully compressed. Referring to FIGS. 4A–4C, a typical Z seal 10 includes a fiber-reinforced elastomer membrane 11 having a zig-zag cross-sectional shape. The zig-zag shape includes a diagonal leg 12 that extends between a first leg 14 and a second leg 16. The first and second legs 14, 16 lie generally parallel to and aligned with one another when the Z seal is uncompressed (FIG. 4A).

As noted above and shown in FIGS. 1–3, one of the kiss seal surfaces is clamped or otherwise secured to a flange. This flange is referred to herein as the "attachment flange 18." As shown in FIGS. 4A–4C, the second leg 16 of the Z seal 10 is attached to the attachment flange 18. The attachment is accomplished by securing the second leg 16 between the attachment flange 18 and a face plate 20 using a number of screws 22.

As also noted above and shown in FIGS. 1–3, the other surface of the kiss seal contacts a flange that approaches the kiss seal during closure. This flange is referred to herein as the "separable flange 28." The separable flange 28 includes a wear plate 26 on its outer surface that makes contact with the kiss seal. Further, the outer surface of the first leg 14 of the Z seal, i.e., the leg that makes contact with the separable flange 28, is covered with a thin contact material, preferably a thin layer of metal coated with Teflon.

Referring to FIG. 4B, during closure, after the wear plate 26 contacts the contact surface 24, the Z seal 10 must be compressed to a certain height before it will provide a seal against leakage during pressure loading. This height is the seal's maximum compression height 30. At heights above this maximum 30, the seal will leak. The value of the maximum compression height for kiss seals in general depends on a number of factors, including membrane stiffness, applied pressure, seal geometry, planform geometry, etc.

Still referring to FIG. 4B, at the Z seal maximum compression height 30, the part of the diagonal leg 12 that is initially nearest the first leg 14 typically folds over onto the first leg 14, while the part of the diagonal leg 12 initially nearest the second leg 16 becomes outwardly arcuate. The tendency to form an arcuate or curved shape is due to the pressure P in the duct. The curved part of the diagonal leg 12 occasionally extends a slight distance outward past the outboard edges 31 of the attachment flange 18.

The inventor has discovered that when the forces produced by the duct pressure acting on the diagonal leg 12 during sealing are summed, they produce a Z seal resultant force vector 34 that is directed substantially horizontally outward. The resultant force vector 34 causes a moment M about the outboard seal corner 36 of the first leg 14. This, in turn, causes the first leg 14 to rotate slightly away from the wear plate 26. As viewed in FIG. 4B, the direction of rotation is counterclockwise. As a result, a slight open wedge 38 is formed between the contact surface 24 and the wear plate 26. When the resultant force vector is resolved into orthogonal and parallel components, the orthogonal force component is approximately zero and the parallel force component is relatively high. (The terms "orthogonal" and "parallel" are relative to the plane of the separable flange 28.)

As is apparent from viewing FIG. 4B, substantially all of the resultant force is resolved into a parallel force. Further, the direction of the force is outward, i.e., away from the duct. The lack of an appreciable orthogonal force reduces the sealing capacity of a Z seal. The inventor has verified, using finite element analysis and lab testing, that even moderate pressure amounts can easily leak past a Z seal of the type shown in FIGS. 4A–4C. The results of the inventor's investigations show that the sealing capacity of Z seals is only moderately effective within a very small range of compression heights.

Referring to FIG. 4C, a Z seal's absolute minimum compression height 40 is the height at which the Z seal can no longer deform uniformly, and after which the Z seal will buckle or crease. (The term "absolute" refers to the seal itself, without the presence of duct pressure P, since pressure actually helps the seal maintain an unfailed form.) The sealing range within which the Z seal is useful lies between its minimum and maximum compression heights 30, 40. As can be seen from viewing FIGS. 4B and 4C and as confirmed by tests, the Z seal's sealing range is relatively small.

Referring to FIGS. 5A–5C, a kiss seal 42 formed in accordance with the present invention (also called herein a "C-type kiss seal" or "C seal" for short) generally includes a membrane 44 that begins as cross-sectionally C-shaped and later achieves an outboard bulbous shape during sealing use. By "bulbous" what is meant is that the membrane 44 (as viewed cross-sectionally) defines an arc of greater-than-180 degrees for a near constant radius.

As shown in the embodiment of FIGS. 5A–5C, the C-shaped membrane 44 includes a first leg 54, a second leg 56, and an arcuate middle leg 46 extending therebetween and outboard of both flanges 18, 28. The first leg 54 includes an exterior contact surface 24' that faces the separable flange 28 during sealing use. As before, the contact surface 24' may be a thin layer of Teflon-coated metal. The second leg 56 is connected to the attachment flange 18, preferably using a face plate 20' similar to that used with a Z seal. In general, the second leg 56 is aligned with the first leg 54.

FIGS. 5A, 5B and 5C show a kiss seal formed in accordance with the invention in an uncompressed state, at a maximum compression height, and at a substantially minimal compression height, respectively. In the uncompressed state of FIG. 5A, the membrane 44 has a definite curve, but is not yet a bulbous protrusion.

Referring to FIG. 5B, just as with a Z seal, a C seal 42 formed in accordance with the invention must be compressed to a certain maximum compression height 30' before effective sealing begins. At heights above the maximum compression height 30', pressure P inside of the duct will push gas between the first leg 54 of the C seal and the separable flange 28. At the maximum compression height, the arcuate middle leg 46 of the membrane 44 begins to take on a bulbous shape by extending in an arc of at least 180 degrees. When the forces acting on a C seal at its maximum compression height 30' are summed, they produce a resultant force vector 58 that lies substantially parallel to the surface of the separable flange 28, i.e., they produce a force vector having a very small orthogonal component. This resultant force vector 58 causes a moment M' about the outboard corner 36' of the separable flange 28. As with the Z seal, this moment M' causes the contact surface 24' of the C seal to rotate slightly away from the wear plate 26. As a result, an open wedge 38' is formed between the contact surface 24' and the wear plate 26.

As the C seal is compressed further, the orthogonal component of the resultant force vector 58 increases as shown clearly in FIG. 5C. Because the attachment flange 18 is approximately as wide as the separable flange 28 and because the flanges are in line with one another as the membrane 44 is compressed, the arcuate middle leg 46 takes on such a bulbous configuration. This shape is in contrast to a Z seal, which does not have a bulbous portion, but instead starts to fold and eventually buckle. The increased orthogonal component of the C seal pushes the first leg 54 toward the wear plate 26. The increased orthogonal component also results in a reduced outward parallel component which in turn reduces the moment M' about the outboard corner 36'. The greater the pressure P on the arcuate middle leg 46, the greater the opposing force vector. This feature can be defined as pressure-augmentation or a self-sealing mechanism, since sealing contact is proportionally related to the applied pressure P.

An added benefit of the C seal can be seen in FIG. 5C. Specifically, the C seal membrane does not fold between the flanges. Therefore, the C seal minimum compression height is the sum of the thicknesses of the upper and lower legs 54, 56 (plus any clamping plates 20') of the C seal membrane. This further increases in the sealing range of a C seal as compared to a Z seal. The moment arm of the C seal moment M' is also reduced which further reduces the value of the C seal moment M'.

FIG. 6 illustrates a C seal formed in accordance with the invention for use in an environment where the attachment flange 18' extends further outboard than the separable flange 28. In this case, the bulbous protrusion is not uniform with respect to both flanges. However, the resistive characteristics of the resultant vector 58 remains the same (i.e., a larger orthogonal component, a smaller parallel component, and a reduced moment arm.)

Preferred embodiments of the present invention have bulbous shapes that extend past the outboard edge 31 of either the separable flange 28 alone (as shown in FIG. 6) or both the separable flange 28 and the attachment flange 18 (as shown in FIG. 5C). The bulbous shape may be made to extend past the outboard edge of the attachment flange 28 alone, but this is not a preferred embodiment. During sealing use, contact between the attachment flange 18 and the membrane is acceptable, since the two surfaces are fastened together to prevent vibration-induced wear between the second leg 56 and the attachment flange 18. However, contact between the separable flange 28 and the membrane should be avoided, because vibration-induced wear is likely to occur between these two unsecured surfaces. Therefore, in order to have effective sealing characteristics while maintaining good wear characteristics, the bulbous shape should extend at least beyond the separable flange 28.

As will be appreciated from the foregoing, the length to the arcuate middle leg 46 of the membrane 44 of a C-type kiss seal formed in accordance with the invention must be adequate to develop a bulbous protrusion having a greater-than-180 degree arc when in use. This means that the length of the arcuate middle leg, in general, must be at least (½) π times the flange gap distance at the maximum compression height. In addition, since pressure is used as the sealing mechanism rather than material flexure, the seal can be made arbitrarily soft in compression without sacrificing seal performance. This allows for easy door closure, even for very large or oddly-shaped seal planforms.

While the preferred embodiment of the invention has been illustrated and described, it will be apparent that various changes can be made therein without departing from the spirit and scope of the invention as defined by the appended claims.

The embodiments of the invention in which an exclusive property or privilege is claimed are defined as follows:

1. A sealing system comprising:
   (a) a first flange having an outboard edge;
   (b) a second flange having an outboard edge, the second flange being positioned in opposed relation to the first flange; and
   (c) a kiss seal disposed between the first and second flanges, the kiss seal comprising a flexible membrane having a first leg, a second leg, and a bulbous arcuate middle portion extending between the first and second legs; the kiss seal being generally cross-sectionally C-shaped; the first leg being positioned adjacent though unsecured to the first flange, the second leg being positioned adjacent and secured to the second flange;
   wherein during sealing use substantially all of the arcuate middle portion is located beyond at least one of the first and second flange outboard edges.

2. The sealing system according to claim 1, wherein during sealing use the bulbous arcuate middle portion forms an arc of greater than 180 degrees positioned beyond both the first and second flange outboard edges.

3. The sealing system according to claim 1, wherein during sealing use the bulbous arcuate middle portion forms an arc of greater than 180 degrees positioned beyond the first flange outboard edge.

4. The sealing system according to claim 1, wherein the kiss seal first leg includes an outer surface disposed directly opposite the first flange; the kiss seal further including a wear plate attached to the first flange, the first leg outer surface making contact with the first flange wear plate during sealing use.

5. The sealing system according to claim 4, wherein during sealing use the first leg rotates slightly away from the first flange wear plate about an axis positioned near the first flange outboard edge and the bulbous shape of the middle portion extends about the outboard edge of the first flange.

6. A sealing system comprising:
   (a) opposed first and second generally planar flanges, each flange having an outboard edge and an exterior surface, the exterior surfaces being positioned in substantially parallel relation, the first and second flanges being capable of moving relative to one another during sealing use; and
   (b) a kiss seal comprising a flexible membrane including:
      (i) a first portion having inboard and outboard edges and an exterior surface, the first portion exterior surface being adapted for contact with the first flange exterior surface such that the first portion outboard edge is positioned near the first flange outboard edge;

(ii) a second portion having inboard and outboard edges and an exterior surface, the second portion being secured to the second flange such that the second portion outboard edge is near the second flange outboard edge, the first and second portions being adapted to move relative to one another in response to relative movement between the first and second flanges during sealing use; and (iii) a bulbous arcuate middle portion directly interconnected between the first and second portion outboard ends; wherein during sealing use the first and second portions are positioned between the first and second flanges and the middle portion forms an arc of greater than 180 degrees to seal against fluid leaks between the opposed flanges substantially all of the middle portion being located beyond at least one of the first and second flange outboard edges:

the system further including a wear plate attached to the first portion exterior surface, the wear plate making direct contact with the first flange exterior surface during sealing use.

7. The sealing system according to claim 6, wherein during sealing use the first portion rotates slightly away from the first flange about an axis positioned near the first flange outboard edge and the bulbous shape of the middle portion extends about the outboard edge of the first flange.

* * * * *

UNITED STATES PATENT AND TRADEMARK OFFICE
CERTIFICATE OF CORRECTION

PATENT NO. : 5,899,463
DATED : May 4, 1999
INVENTOR(S) : W.J. Koch

It is certified that error appears in the above-identified patent and that said Letters Patent is hereby corrected as shown below:

| COLUMN | LINE | |
|---|---|---|
| [54]<br>Pg. 1, col. 1 | Title | "PRESSURE AUGMENTED" should read<br>--PRESSURE-AUGMENTED-- |
| 7<br>(Claim 6, | 8<br>line 18) | After "edge" delete "," and insert therefor --;-- |
| 8<br>(Claim 6, | 2<br>line 28) | After "flanges" insert --,-- |
| 8<br>(Claim 6, | 4<br>line 30) | After "edges" delete ":" and insert therefor --;-- |

Signed and Sealed this

Twelfth Day of October, 1999

Attest:

Attesting Officer

Q. TODD DICKINSON

Acting Commissioner of Patents and Trademarks